(12) United States Patent
Wang et al.

(10) Patent No.: US 11,032,287 B1
(45) Date of Patent: Jun. 8, 2021

(54) DELEGATED ADMINISTRATOR WITH DEFINED PERMISSION BOUNDARIES IN A PERMISSION BOUNDARY POLICY ATTACHMENT FOR WEB SERVICES AND RESOURCES

(71) Applicant: Amazon Technologies, Inc., Seattle, WA (US)

(72) Inventors: Mingkun Wang, Lynnwood, WA (US); Jasmeet Chhabra, Sammamish, WA (US); Hang Li, Seattle, WA (US); Chenguang Yin, Seattle, WA (US); Dan Popick, Seattle, WA (US); Alazel Acheson, Redmond, WA (US); Apurv Awasthi, Issaquah, WA (US); Brigid Ann Johnson, Seattle, WA (US); Conor P. Cahill, Waterford, VA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 358 days.

(21) Appl. No.: 16/122,192

(22) Filed: Sep. 5, 2018

Related U.S. Application Data

(60) Provisional application No. 62/693,007, filed on Jul. 2, 2018.

(51) Int. Cl.
*H04L 29/06* (2006.01)
*G06F 21/62* (2013.01)
(Continued)

(52) U.S. Cl.
CPC .......... *H04L 63/102* (2013.01); *G06F 21/604* (2013.01); *G06F 21/62* (2013.01); *H04L 63/20* (2013.01); *G06F 2221/2141* (2013.01)

(58) Field of Classification Search
CPC ..... H04L 63/102; H04L 63/20; G06F 21/604; G06F 21/62; G06F 7/00; G06F 7/04; G06F 21/36
See application file for complete search history.

(56) References Cited

U.S. PATENT DOCUMENTS

| 7,913,084 | B2* | 3/2011 | Medvinsky | ........... | H04L 9/3273 713/168 |
| 8,332,922 | B2* | 12/2012 | Dickinson | .............. | G06Q 20/40 726/10 |

(Continued)

*Primary Examiner* — Shanto Abedin
(74) *Attorney, Agent, or Firm* — Lowenstein Sandler LLP

(57) ABSTRACT

A method and system for generating permissions policies and permission boundary policies are described. The system receives a first request from a central administrator to create a delegated administrator, the first request specifying with one or more access permissions. The system generates a permission boundary policy that specifies the one or more access permissions and a first permissions policy that grants permissions to the delegated administrator to at least one of create an IAM principal with the permission boundary policy or attach a second permissions policy to the IAM principal. An effective permission given to the IAM principal is an intersection of access permissions specified in the first permissions policy and the one or more access permissions in the permission boundary policy. The system attaches the first permissions policy and the permission boundary policy to the delegated administrator.

20 Claims, 9 Drawing Sheets

(51) Int. Cl.
*G06F 17/00* (2019.01)
*G06F 21/60* (2013.01)

(56) References Cited

U.S. PATENT DOCUMENTS

| | | | | |
|---|---|---|---|---|
| 8,769,642 | B1 * | 7/2014 | O'Neill | H04L 63/102 |
| | | | | 726/5 |
| 8,966,570 | B1 * | 2/2015 | Roth | H04L 63/08 |
| | | | | 726/1 |
| 9,098,675 | B1 * | 8/2015 | Roth | H04L 63/0884 |
| 9,104,666 | B2 * | 8/2015 | Goyal | G06F 21/6218 |
| 10,311,248 | B1 * | 6/2019 | Ilkal | G06F 21/604 |
| 2011/0296523 | A1 * | 12/2011 | Schechter | G06F 21/6218 |
| | | | | 726/21 |
| 2014/0052839 | A1 * | 2/2014 | Anuff | H04L 41/22 |
| | | | | 709/223 |
| 2014/0075565 | A1 * | 3/2014 | Srinivasan | H04L 41/5054 |
| | | | | 726/26 |
| 2014/0310769 | A1 * | 10/2014 | O'Neill | H04L 63/102 |
| | | | | 726/1 |
| 2016/0292433 | A1 * | 10/2016 | Yu | G06F 21/604 |
| 2016/0335118 | A1 * | 11/2016 | Beiter | G06F 9/468 |

* cited by examiner

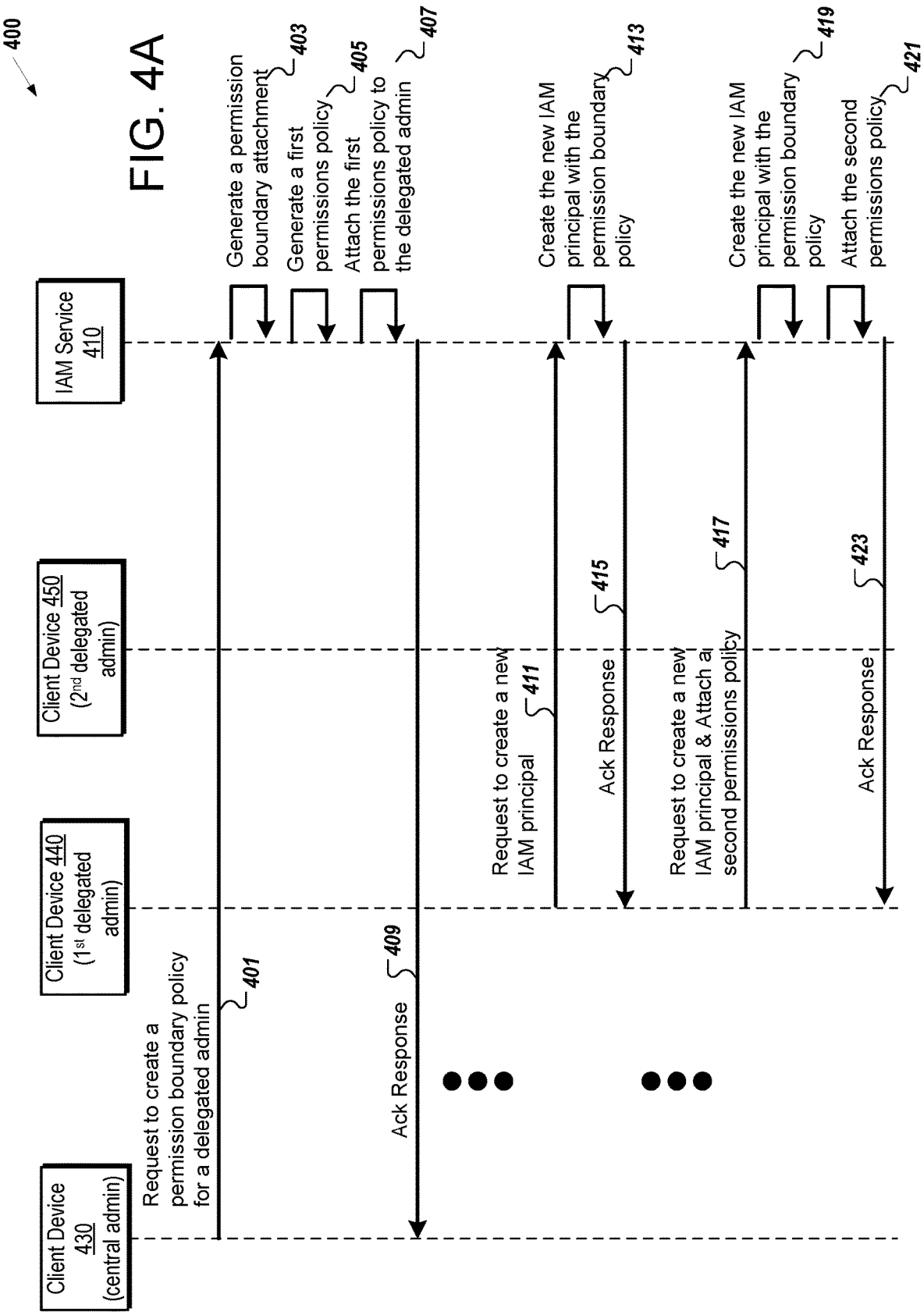

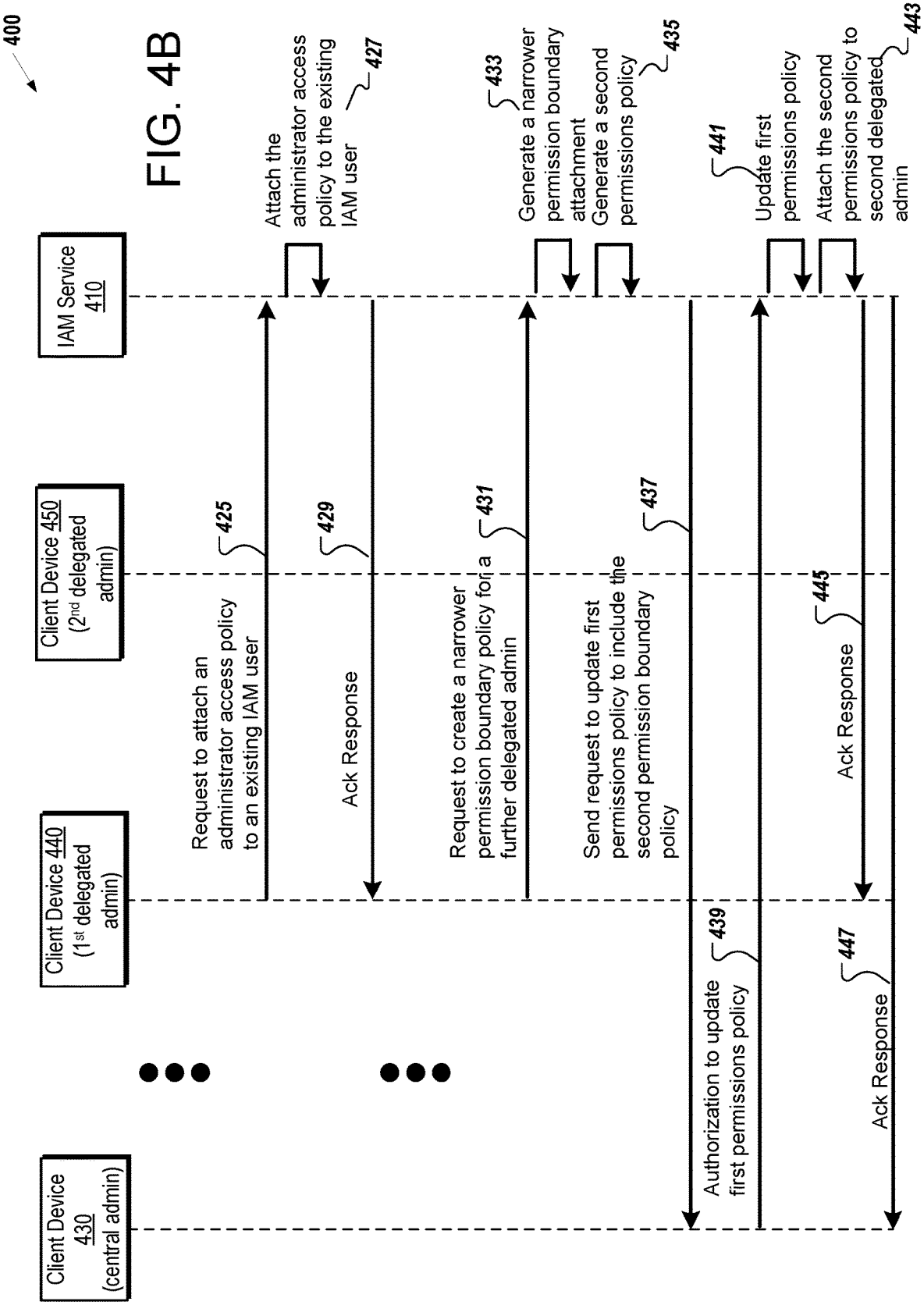

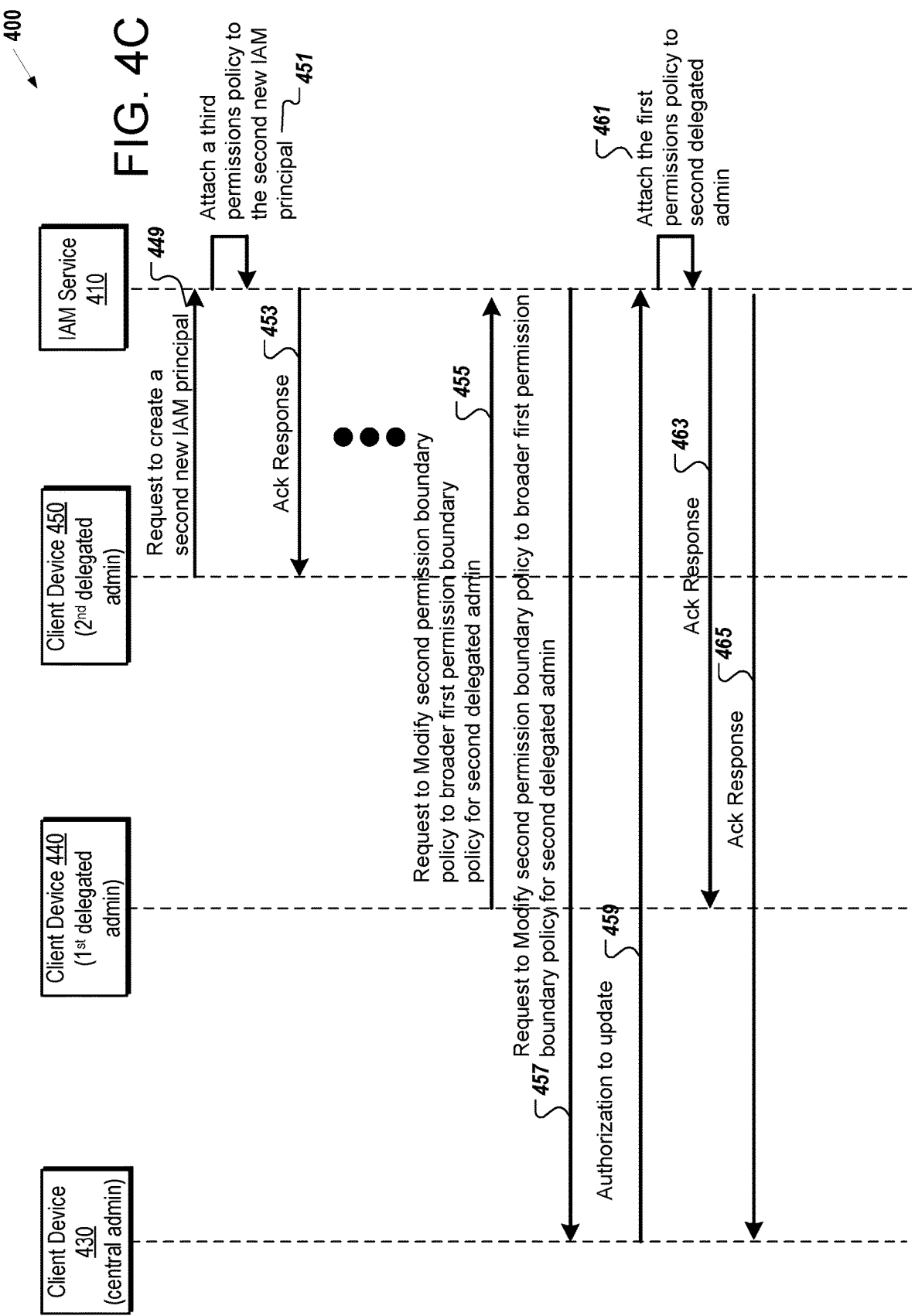

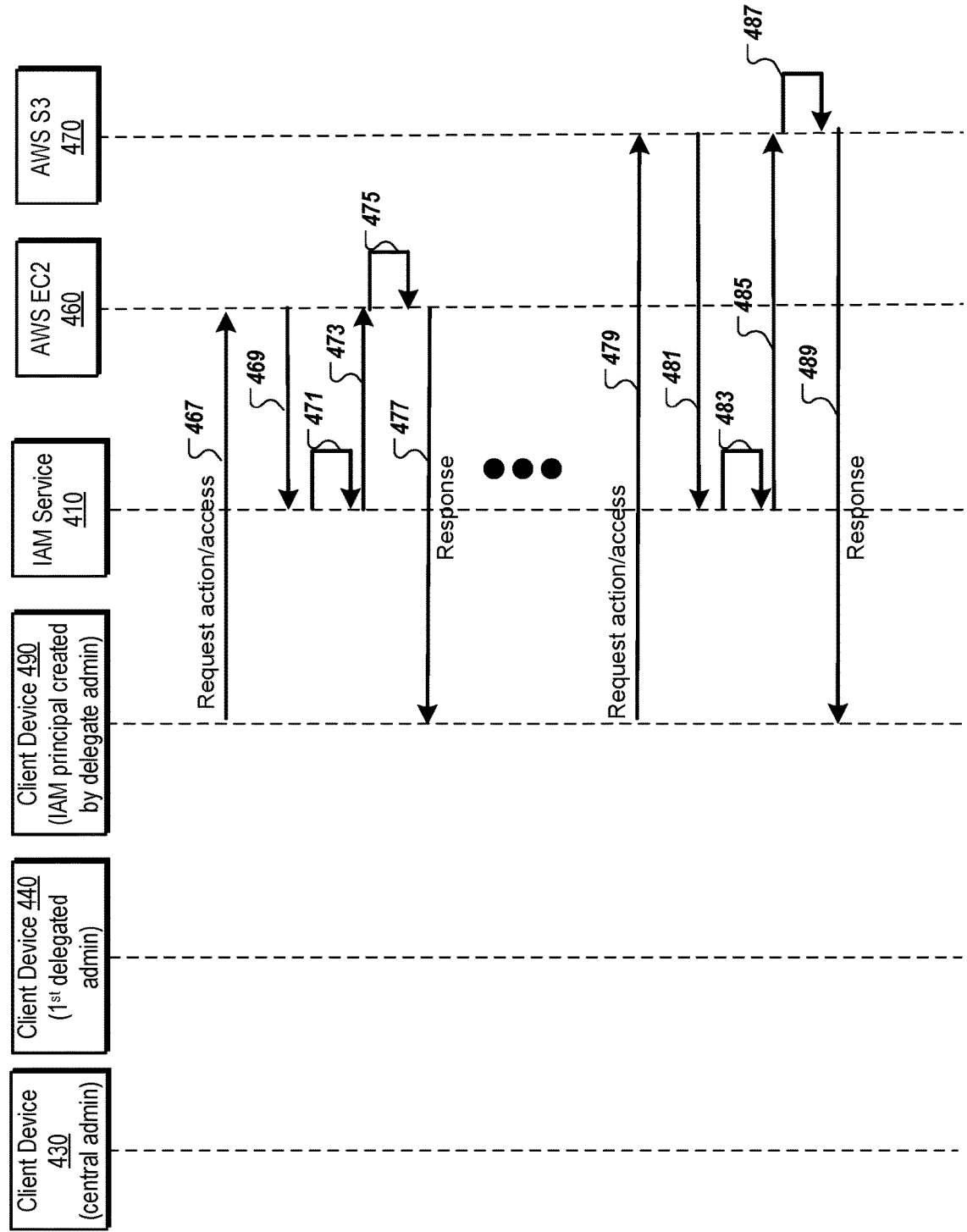

DELEGATED ADMINISTRATOR WITH DEFINED PERMISSION BOUNDARIES IN A PERMISSION BOUNDARY POLICY ATTACHMENT FOR WEB SERVICES AND RESOURCES

RELATED APPLICATIONS

This application claims the benefit of Provisional Application No. 62/693,007, filed Jul. 2, 2018, which is incorporate by reference herein.

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

Security to web services is an important aspect to customers of the web services. Access management systems are used to control access to web services and corresponding resources. Access management to web services may include access permissions to control access for various users and types of users to these services and resources. Access management to web services can be very complex. In some cases, a customer sets up controls to govern access to resources and services and gets frustrated with debugging complex permissions to figure out what will work. The customer may give up and set permissions that are too permissive for their needs.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIGS. 4A-4D illustrate a flow diagram a flow of operations of with an access management system having a client permissions manager according to one embodiment.

DETAILED DESCRIPTION

Figure 1:
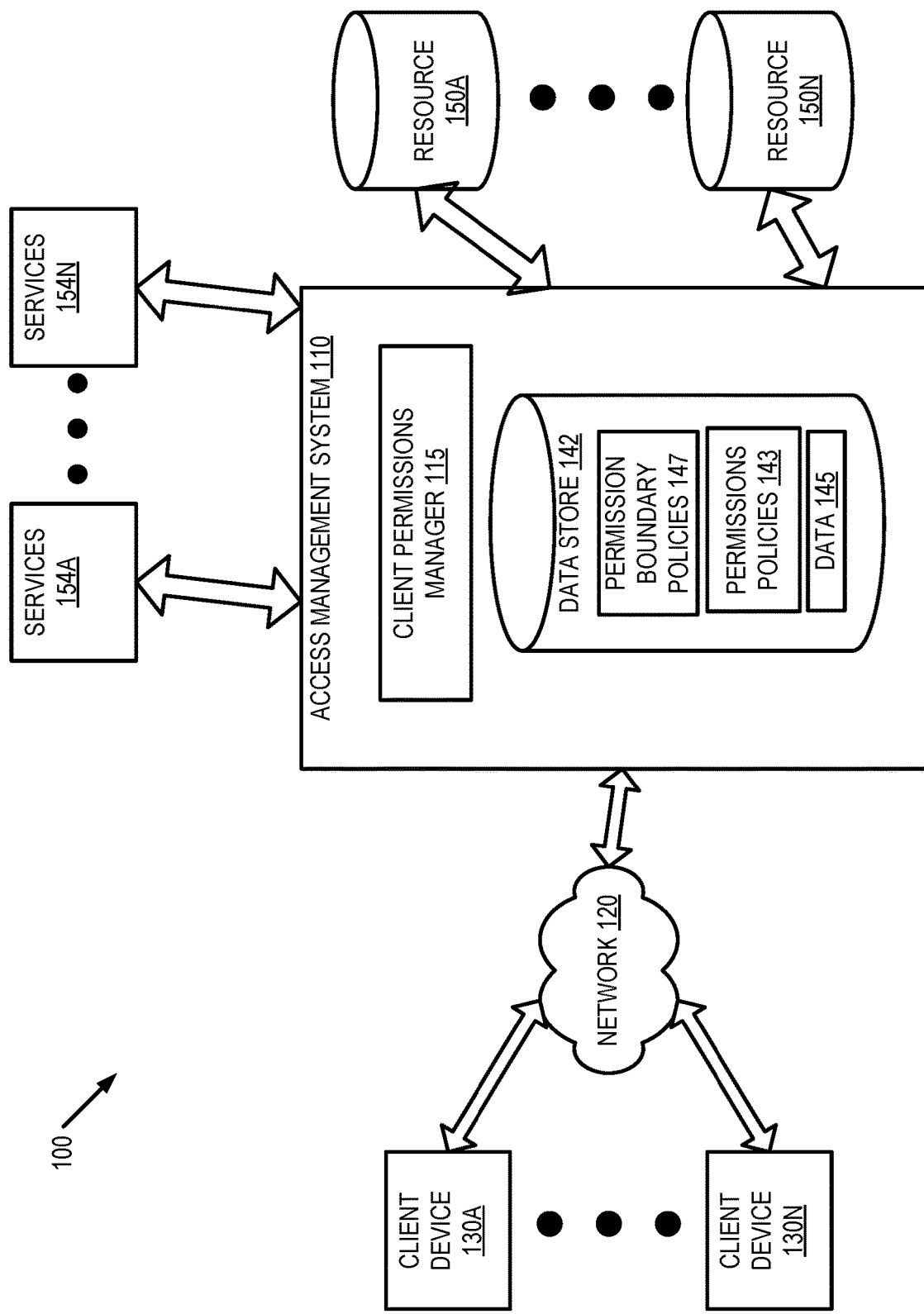
FIG. 1 is a block diagram of an example network architecture in which embodiments of a client permissions manager may operate.

Embodiments described herein relate to access management to web services and resources by an access management system having a managed policy attachment (referred to herein as "permission boundary" attachment) that specifies permission boundaries for a delegated administrator. The access management system can be a core service that allows customers to control security of other web services and resources on the cloud. The embodiments described herein are directed to permission boundary attachments that enable a "Delegated Administrator" feature. The "Delegated Administrator" is a feature where a central administrator of an Identity and Access Management (IAM) service can grant trusted employees, as "delegated administrators," permissions to manage IAM permissions without escalation of privileges. The central administrator is considered the original grantor of a permission boundary attachment to other IAM users as delegated administrators. That is new IAM users created by the delegated administrator will never exceed the permission boundaries specified by the original grantor (central administrator). The central administrator grants these permissions using a managed policy attachment called a permission boundary attachment, which specified the maximum permissions on an IAM principal. Once attached to an IAM user or role, the effective permissions will be an intersection of a regular policy attachment and the permission boundary attachment. It should be noted that although some policies are described as policy attachments that are attached to IAM principals, in other embodiments, the policies, including the permission policies and the permission boundary policies, can be associated with the IAM principals.

As an example, a central administrator, Alice, wants to ensure that employees create resources in a single region (e.g., US-East-1 region only). Alice also wants a trusted employee, delegated administrator Bob, to be able to create IAM principals and attach permissions to these principals, without allowing Bob (or others) to exceed the permission boundary defined by Alice. To enable Bob as a delegated administrator, a new type of managed policy attachment is introduced called a permission boundary attachment, which specifies the maximum permission on an IAM principal. Once attached to a user/role of the IAM principal, the effective permission given to the IAM principal will be an intersection of any regular attachments and the permission boundary attachment.

These embodiments can reduce a number of escalations of privileges because users created by the delegated administrator with the permission boundary attachment will never exceed the permissions specified by the original grantor. In one embodiment, the access management system is an identity and access management (IAM) service executed by one or more computing devices and manages access to web services and resources. The IAM service receives a first request from a central administrator to create a delegated administrator, the first request specifying a permission boundary policy with one or more access permissions to allow and deny access to the web services and resources. The access permissions may allow and deny a IAM user/role (also referred to herein as IAM principal) to perform one or more actions or access web services or resources. That is use permissions may be a subset of access permissions as described herein. In response to the first request, the IAM service generates a permission boundary policy attachment that specifies the permission boundary policy and generates a permissions policy attachment that grants permissions to the delegated administrator to create a new IAM principal or modify an existing IAM principal with the permission boundary policy attachment and that grants permissions to the delegated administrator to attach a permissions policy to the new IAM principal. An effective permission on the new IAM principal is an intersection of access permissions specified in the permissions policy attachment and the one or more access permissions in the permission boundary policy attachment. The IAM service attaches the permissions policy and the permission boundary policy attachment to the delegated administrator. Subsequently, the IAM service receives a second request from a IAM user created by the delegated administrator, the second request specifying at least one of an action or access to a web service or a resource. The IAM service determines that the action or access for the IAM user is within the intersection of access permissions specified in the permissions policy attachment and the one or more access permissions in the permission boundary policy attachment. The IAM service allows or denies the action or access in view of the determining.

FIG. 1 is a block diagram of an example network architecture 100 in which embodiments of a client permissions manager 115 may operate. The network architecture 100 may include access management system 110 and a client device 130 capable of communicating with access management system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 120 may have any suitable communication range associated therewith and may include, for example, public networks (e.g., the Internet), metropolitan area networks (MANs), wide area networks (WANs), local area networks (LANs), or personal area networks (PANs). In addition, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Client device 130 may include any type of mobile or non-mobile computing device (e.g., that has a finite power source) or traditionally non-portable computing device. Client device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), voice-controlled device, and so on. Client device 130 may also be a traditionally non-portable computing device such as a desktop computer, a server computer, or the like. Client device 130 may be configured with functionality to enable execution of an application to interact with an access management system 110, including a client permissions manager 115.

Communication between the access management system 110 and the client device 130 may be enabled via any communication infrastructure, such as public and private networks. One example of such an infrastructure includes a combination of a wide area network (WAN) and wired or wireless infrastructure, which allows a user to use client device 130 to interact with access management system 110 without being tethered to the access management system 110 via hardwired links. The wireless infrastructure may be provided by one or multiple wireless communications systems. One of the wireless communication systems may be a wireless local area network (WLAN) access point connected with the network 120. Another of the wireless communication systems may be a wireless carrier system that can be implemented using various data processing equipment, communication towers, etc. Alternatively, or in addition, the wireless carrier system may rely on satellite technology to exchange information with the client device 130.

Access management system 110 may be set up by an entity such as a company or a public sector organization to provide identify and access management to one or more services (such as various types of cloud-based computing or storage) accessible via the Internet and/or other networks to client device 130. Access management system 110, and corresponding web services, may include numerous data centers hosting various resource pools, such as collections of physical and/or virtualized computer servers, storage devices, networking equipment and the like, needed to implement and distribute the infrastructure and services offered by the access management system 110, including to provide multi- and single-tenant services. In some embodiments, access management system 110 may implement the client permissions manager 115 to manage access to associated web services 154A-154N, provide access to other computing resources 150A-150N, such as a virtual compute service and storage services, such as object storage services, block-based storage services, data warehouse storage service, archive storage service, and/or any other type of network based services (which may include various other types of storage, processing, analysis, communication, event handling, visualization, and security services, such as a code execution service that executes code without client management of the execution resources and environment). Client device 130 may access these various services 154A-N and resources 150A-N via access management system 110, for example through an application programing interface (API) or a command line interface (CLI). Likewise network-based services may themselves communicate and/or make use of one another to provide different services.

Access management system 110 may include the client permissions manager 115 that controls one or more user's access to the services 154A-N, the resources 150A-N, or any combination thereof. The services 154A-N may include computing services, storage services, database services, application services, or the like. The resources 150A-N may include computing resources, storages resources, database resources, application resources, or the like. The client permissions manager 115 can be used to grant different permissions to different users for difference services and resources. For example, the client permissions manager 115 can be programmed to allow some users complete access to Amazon Elastic Compute Cloud (Amazon EC2), Amazon Simple Storage Service (Amazon S3), Amazon DynamoDB, Amazon Redshift, and other AWS services. For other users, the client permissions manager 115 can allow read-only access to just some S3 buckets, or permission to administer just some EC2 instances, or to access billing information, but nothing else. The client permissions manager 115 can be used to securely give applications that run on EC2 instances the credentials that they need in order to access other resources, like S3 buckets and RDS or DynamoDB databases.

The client permissions manager 115 can be used to authenticate a user or a group of users and can be used to authorize actions to be performed by services for the user or authorize access to resources by those services or by the user directly using permissions policies 143. The permissions policies 143 can be stored in a data store 142 of one or more data repositories accessible by the components of the access management system 110. The client permissions manager 115 can be used to authorize actions to be performed by a delegated administrator with respect to web services, users, roles, resources, or the like, using permission boundary policies 147 (also referred to herein as permission boundary attachments). A permission boundary policy is a special, managed policy attachment that specifies permission boundaries for the delegated administrator. The permissions granted to users or roles created or modified by the delegated administrator will never exceed the permission boundaries specified by the original grantor (central administrator) in the permission boundary policy 147. For example, an effective permissions of a user, created or modified by a delegated administrator, will be an intersection of a permissions policy 143 and the permission boundary policy 147 attached to the user. In some cases multiple permission boundary policies may be associated with an IAM principal (IAM user, IAM role, or group of IAM users). In these cases, the multiple permission boundary policies may be the union of the access permissions, the intersection of the access permissions, or the like. In other cases, the access permissions can be prioritized in how to manage conflicts between the access permissions in the multiple permission boundary policies.

In one embodiment, a customer may have one central administrative account, for example, through which the customer can define security policies for one or more web service resources. The central administrator can create a delegated administrator with one or more permission boundary policies 147 to restrict access permissions given to IAM principals created or modified by the delegated administrator. The security policies may include configuration rules specifying parameters, such as resource type, scope, tag or accounts to which the policy is applicable. In one embodiment, the scope defines an inclusion or exclusion of resources for protection under the security policies based on a resource name or other identifying attribute. The customer may further have one or more member accounts associated with the administrative account. The delegated administrators may be one of more of these member accounts. In one embodiment, the member accounts created by a delegated administrator may inherit the security policies defined by the delegated administrative account, according to the parameters in the policy configuration rules.

The access management system 110, and its corresponding components, can be accessed in one or more of the following ways: a management console that is a browser-based interface to manage the access management system 110, and corresponding services and resources; a command line tool that can be used to issue commands at a client device's command line to perform access management tasks. The command line tool can also be used in connection with scripts to perform tasks. The access management system 110 may also include an application programming interface (API) to permit requests directly to the service. This API may be an HTTP-based API in which the requests are HTTP requests made directly to the services. Alternatively, other libraries and code can be used to create programmatic access to the access management system 110. In one embodiment, a customer defines a security policy through an associated administrative account. For example, the customer may provide an administrative account policy definition to the client permissions manager 115 through an API/GUI console. As described above, the policy may relate to the security posture associated with resources available to that administrative account in a web services environment. Similarly, the customer can provide a delegated administrator account definition to the client permissions manager 115 through an API/GUI console. The client permissions manager 115 can generate one or more permissions policies 143, one or more permissions boundary policies 147, and can store other data 145 or metadata in the data store 142. The client permission manager 115 can used the stored permission boundary policies 147 and the permissions policies 143 to determine whether that the action or access for an IAM principal is within the intersection of access permissions specified in the permission boundary policies 147 and the one or more access permissions in the and the permissions policies 143, allowing or denying the action or access in view of the determination.

The client permissions manager 115 can use permissions policies to govern access to the services 154A-N and resources 150A-N. For example, the client permissions manager 115 may receive a request from a service 150A to perform an action or access a resource 150A for a user of the service. The client permissions manager 115 can authenticate the user of the service and determine whether to authorize the authenticated user for this particular action or access to the resource 150.

As described above, the central administrator can receive numerous escalations of privileges. The delegated administrator can be used to manage IAM permissions with a reduction in or elimination of escalation of privileges to the central administrator since the access permissions given by the delegated administrator will never exceed the permission boundaries specified by the original grantor (central administrator) in the permission boundary policies 147. The client permissions manager 115 can be used to generate permissions policies 143 for a user or role to be enforced by the client permissions manager 115. The client permissions manager 115 can be used to generate permission boundary policies 147 for a delegated administrator when creating or modifying other users or roles. In one embodiment, the access management 110 can start the client permissions manager 115 in response to a request to initiate creation of a delegated administrator for managing IAM principals to web services and resources. The request to create or modify the delegated administrator can specify user credentials for the central administrator.

In another embodiment, the client permissions manager 115 sends the permissions policies 143 and permission boundary policies 147 to a client device 130. The client permissions manager 115 can receive a request to apply the permissions policies 143 and permission boundary policies 147 to a user. In another embodiment, the permissions policies 143 and permission boundary policies 147 can be applied to a resource. Alternatively, the permissions policies 143 and permission boundary policies 147 can be applied to a group of users, a role, a human user, a machine user, or the like.

In another embodiment, the client permissions manager 115 receives an authentication and authorization request from a first web service in response to a client request, received at the first web service, to perform the action or access the resource. The client permissions manager 115 receives data regarding the client request from the first web service. The data may include a user identifier, an action identifier, and a resource identifier. The client permissions manager 115 can check the permission boundary policies 147 and the permissions policies 143 for the client request.

The access management system 110 is eventually consistent and can achieve high availability by replicating data across multiple servers within data centers around the world. If a request to change some data is successful, the change is committed and safely stored. However, the change must be replicated across all access management system servers, which can take some time. Such changes include creating or updating users, groups, roles, or policies. Changes, for example, can be made in a separate initialization or setup routine and actions can be taken to verify that the changes have been propagated before production workflows depend on them.

Examples of cloud services include compute services that provide scalable computing capacity (e.g., in the form of virtual machine instances or containers), object storage services that implement scalable object storage systems, database services that implement structured query language (SQL) interface or NoSQL interfaces, and other services which may include one or more software applications, the hardware on which the applications are executed, and the supporting infrastructure including auxiliary hardware components and other resources (e.g., load balancers, security certificates, configuration settings, and health monitors). Access to one or more cloud services may be controlled by the IAM service, which may authenticate a requesting client (e.g., 130A-130N) based on the presented client credentials and enforce permission-based granular access control to the cloud resources by applying the associated permissions policies 143 (e.g., resource access policies) and the permission boundary policies 147. Various third-party agents may be integrated with cloud-based services by assigning a client's cloud service access rights to such agents on a temporary or permanent basis.

In another embodiment, the network architecture 100 is a cloud infrastructure, in which systems and methods described herein may operate. The cloud infrastructure may include a compute service 110, an object storage service, a database service, the IAM service (e.g., 110), as well as various other services that are omitted for clarity and conciseness. The services may each run in a dedicated cluster including one or more hardware servers. Alternatively, two or more services may be collocated in a cluster including one or more hardware servers. Servers executing the above listed services may be interconnected by one or more networks, including one or more local area networks, one or more wide area networks, or any combination thereof. In various illustrative examples, the compute service may provide scalable computing capacity, e.g., in the form of virtual machine instances or containers. The object storage service may implement a scalable object storage system with a web service interface. The database service may implement a database exporting a structured query language (SQL) interface or a NoSQL interface. The IAM service may provide client authentication and authorization by authenticating a requesting client based on the presented client credentials and enforcing permission-based granular access control to the cloud resources based on associated permissions policies 143 and permission boundary policies 147. The permissions policies 143 may include one or more sets of resource access permissions for a specified resource, based on a client identifier and/or group. These and other services may have configurable high-availability, auto-scaling and other operational features.

Figure 2:
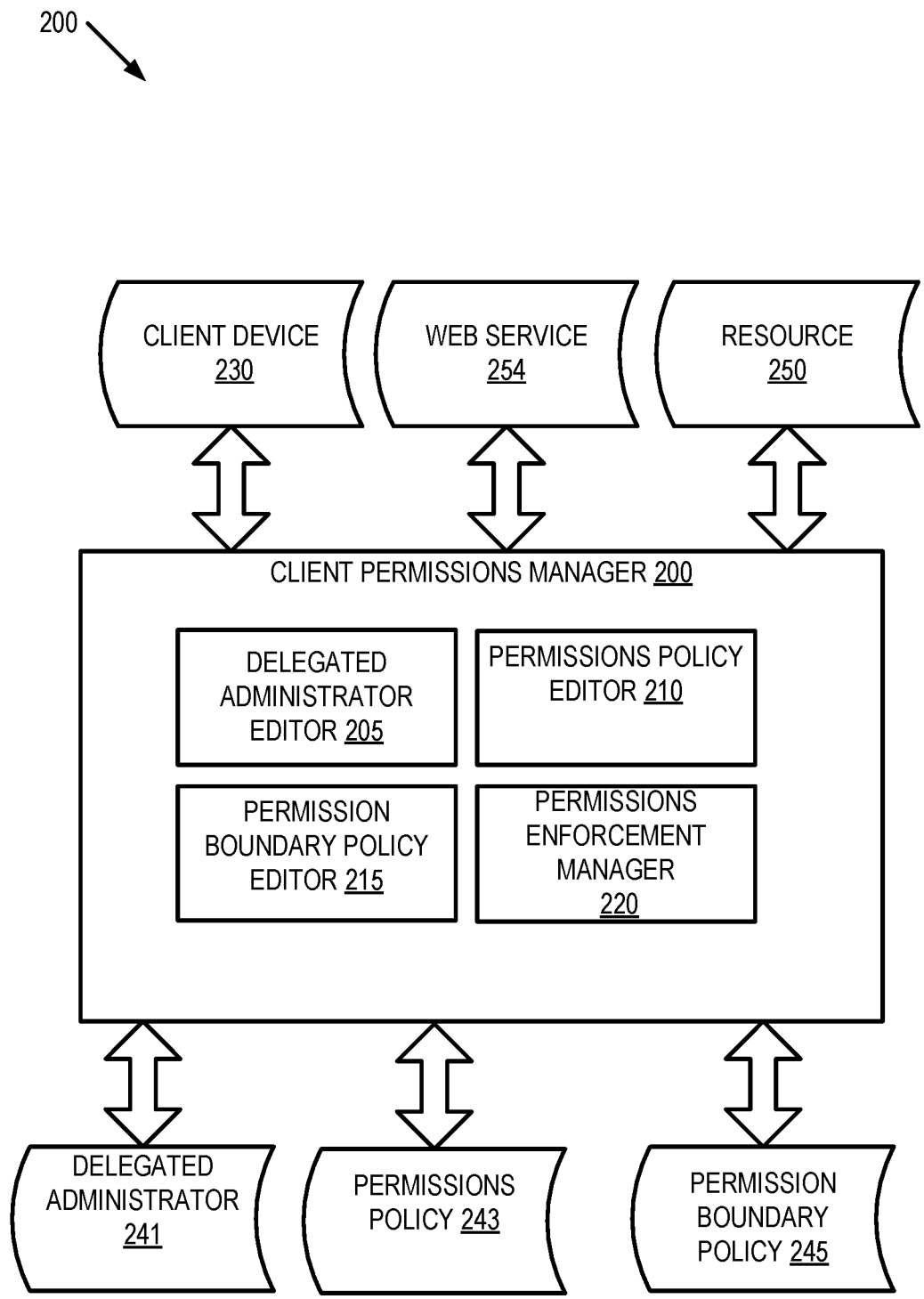
FIG. 2 is a block diagram of a logical view of a client permissions manager, in accordance with one embodiment.

FIG. 2 is a block diagram of a logical view of a client permissions manager 200, in accordance with one embodiment. The client permissions manager 200 may correspond to the client permissions manager 115 of FIG. 1. In some embodiments, client permissions manager 200 may include a delegated administrator editor 205, a permissions policy editor 210, a permission boundary editor 215, and a permissions enforcement manager 220. Collectively the components of the client permissions manager 200 may create, modify, and utilize a permissions policy 243 and a permission boundary policy 245 to manage IAM principals, creating new IAM principals, attaching policies to new IAM principals, attaching new policies to new or existing IAM principals, and detaching existing policies from existing IAM principals, and the like. The IAM principal may be an IAM user or a IAM role. The functionality of the individual components described with respect to FIG. 2 may be integrated into one more software components. The client permissions manager 200 may also include other software components, such as an API, a CLI, or the like.

In one embodiment, the delegated administrator editor 205 can receive a request to create a new delegated administrator 241 or modify an existing permissions policy 241. The delegated administrator editor 205 can send an acknowledgement response when the new delegated administrator 241 is created or the existing delegated administrator is modified. The permissions policy editor 210 can receive a request to create a new permissions policy 243 or modify an existing permissions policy 243. The permissions policy editor 210 can send an acknowledgement response when the new permissions policy 243 is created or modified. The permissions boundary policy editor 210 can receive a request to create a new permission boundary policy 245 or modify an existing permissions policy 245. The permission boundary editor 215 can send an acknowledgement response when the new permission boundary policy 245 is created or modified. The delegated administrator editor 205 can notify one or more web services or other instances of the access management system that the new delegated administrator is created or modified and can wait for a period to make sure that the new delegated administrator or modified delegated administrator user is available at global end points of the system. Alternatively, the delegated administrator editor 205 does not have to wait for global end-points to be updated. However, in response to the delegated administrator editor 205 being updated and available at the global end-points, the delegated administrator editor 205 can notify the client device 230 that the new or modified delegated administrator is activated and ready. The delegated administrator editor 205 can assign a user identifier for the delegated administrator and send this user identifier to the client device 230.

The client device 230, during operation, can request a service to perform an action or access a resource. In response to a request received at the web service from the client device 230, the web service sends a request to authenticate and authorize the action, access, or both to the access management system 110. The permissions enforcement manager 220 can determine whether to allow or deny the request by checking an intersection of the access permission specified in the permission policy 243 and the access permissions specified in the permission boundary policy 245. In response, the permissions enforcement manager 220 can send a response to indicate that the request to authenticate and authorize was successful. The client device 230 can send zero or more additional requests for the same web service or different services to perform additional actions and access the same or different resources.

In one embodiment, the client permissions manager 200 receives a request from the client device 230 to generate a permissions policy for a delegated administrator. In response, the permissions policy editor 210 creates the permissions policy 243 and the permission boundary policy editor 215 creates the permission boundary policy 245 to be used by the permission enforcement manager 220 to manage access to the web service 254, the resource 250, or both. The permissions policy 243, the permission boundary policy 245, or both can be provided to the client device 230 for selection and editing. Using the permission policy editor 210 and the permission boundary policy editor 215, the client device 230 can select and edit the permissions policy 243 and permission boundary policy 245. In response to a request from the client device 230, the client permissions manager 210 can apply the permissions policy 243 and the permission boundary policy 245 to a user (User Y) to be enforced by the client permissions manager 115 described above with respect to FIG. 1. It should be noted that this user is not the delegated administrator but an actual user of the web service 254 that is created or modified by the delegated administrator. In another embodiment, the permissions policy 243 and permission boundary policy 245 can be applied to a resource 250. Alternatively, the permissions policy 243 and permission boundary policy 245 can be applied to a group of users, a role, a human user, a machine user, or the like.

The following description includes some examples of permissions policy 243 and permission boundary policy 245 with permissions for various web services or resources using various scenarios.

In a first scenario, a central administrator, Alice, wants to ensure that employees create resources only in a specific region, namely the us-east-1 region only. Alice also wants trusted employee, delegated administrator Bob, to be able to create IAM principals and attach permissions to these principals, without allowing Bob (or others) to exceed the permission boundary defined by Alice. The central administrator, Alice, creates a managed permission boundary policy, called SamplePermissionBoundary, which permits actions on the web service EC2 and Lambda actions in the us-east-1 region. Alice will use this policy as the permission boundary for Bob.

SamplePermissionBoundary
// Allow IAM actions
{
  "Effect": "Allow",
  "Action": [
  "iam:CreateUser",
  "iam:CreateRole",
  "iam:AttachUserPolicy",
  "iam:DetachUserPolicy",
  "iam:AttachRolePolicy",
  "iam:DetachRolePolicy"
  ],
  "Resource": "*",
  "Condition": {
  "StringEquals": {
    "iam:PermissionBoundary":
"am:aws:iam::123456789012:policy/permissionboundary-policy/SamplePermissionBoundary"
  }
  }
}
// Grant CreatePolicy permission
{
  "Effect": "Allow",
  "Action": "iam:CreatePolicy",
  "Resource": "*"
}
// Control EC2 actions in us-east-1
{
  "Effect": "Allow",
  "Action":
  "ec2:RunInstances",
  "ec2:StartInstances",
  "ec2:StopInstances"
  ]
  "Resource": "*",
  "Condition": {
  "StringEquals": {
    "ec2:Region": "us-east-1"
  }
  }
}
// Control resource for lambda within us-east-1
{
  "Effect": "Allow",
  "Action": "lambda:*",
  "Resource": "arn:aws:lambda:us-east-1:::"
}

Continuing with the example, Alice creates a permissions policy, SamplePermission. This grants permissions to create IAM roles if the permission boundary, SamplePermissionBoundary, is provided. This also allows attaching permissions to IAM principals if their permission boundary is SamplePermissionBoundary.

SamplePermission
{
  "Effect": "Allow",
  "Action": [
  "iam:CreateUser",
  "iam:CreateRole",
  "iam:AttachUserPolicy",
  "iam:DetachUserPolicy",
  "iam:AttachRolePolicy",
  "iam:DetachRolePolicy"
  ],
  "Resource": "*",
  "Condition":
  "StringEquals":
    "iam:PermissionBoundary":
"arn:aws:iam::123456789012:policy/permissionboundary-policy/SamplePermissionBoundary"
  }
  }
}
{
  "Effect": "Allow",
  "Action": "iam:CreatePolicy",
  "Resource": "*"
}
{
  "Effect": "Allow",
  "Action": [
  "iam:GetUser",
  "iam:GetRole"
  ],
  "Resource": "*"
}

Continuing with the example above, Alice attaches SamplePermission to Bob as follows:
Alice.AttachRolePolicy(Name=Bob,
PolicyArn=SamplePermission)

Continuing with the example above, Bob now creates a new IAM principal, Cindy, with the permission boundary policy SamplePermissionBoundary as follows:
Bob.CreateRole(Name=Cindy,
PermissionBoundary=SamplePermissionBoundary)

Continuing with the example above, Bob attaches the AWS managed policy EC2FullAccess permissions policy to Cindy as follows:
Bob.AttachRolePolicy(Name=Cindy,
PolicyArn=EC2FullAccess)

In this example, Cindy's effective permissions are EC2 actions on us-east-1, as an intersection of the access permissions specified in SamplePermission and the access permissions in SamplePermissionBoundary.

In a second scenario, the delegated administrator, Bob, wants to create IAM user Dan who can in turn create other IAM principals and attach permissions to these principals. Bob attaches the *:* permission policy (AdministratorAccess) to Dan as follows:
Bob.AttachUserPolicy(Name=Dan,
PolicyArn=AdministratorAccess)

Dan's effective permissions are what are specified in SamplePermissionBoundary.

In a third scenario, the delegated administrator Bob wants to create an IAM user, Elliot, who can in turn create other IAM principals and attach permissions to these principals. However, Bob wants to further restrict the permission boundary of principals that Elliot will create. Bob generates a narrower managed policy and names this policy SampleNarrowerPermissionBoundary. Notice, when compared to SamplePermissionBoundary, this policy does not grant any EC2 actions as shown below:
SampleNarrowerPermissionBoundary
// Allow IAM actions
{
  "Effect": "Allow",
  "Action": [
  "iam:CreateUser",
  "iam:CreateRole",
  "iam:AttachUserPolicy",
  "iam:DetachUserPolicy",
  "iam:AttachRolePolicy",
  "iam:DetachRolePolicy"
  ],
  "Resource": "*",
  "Condition": {
  "StringEquals": {
    "iam:PermissionBoundary":
"am:aws:iam::123456789012:policy/permissionboundary-policy/SamplePermissionBoundary"
  }
  }
}
{
  "Effect": "Allow",
  "Action": "iam:CreatePolicy",
  "Resource": "*"
}
// Control resource for lambda within us-east-1
{
  "Effect": "Allow",
  "Action": "lambda:*",
  "Resource": "arn:aws:lambda:us-east-1:::"
}

The delegated administrator, Bob, requests Alice to update his permission so that Bob can use this permission boundary policy. The central administrator, Alice, updates SamplePermission as shown below to update what permission's Bob has as delegated administrator.
Alice.UpdatePolicy(Name=SamplePermission,
Content=SamplePermissionPolicyContent)
SamplePermission
{
  "Effect": "Allow",
  "Action": [
  "iam:CreateUser",
  "iam:CreateRole",
  "iam:AttachUserPolicy",
  "iam:DetachUserPolicy",
  "iam:AttachRolePolicy",
  "iam:DetachRolePolicy"
  ],
  "Resource": "*",
  "Condition":
  "StringEquals":
    "iam:PermissionBoundary":
"am:aws:iam::123456789012:policy/permissionboundary-policy/SamplePermissionBoundary",
"iam:PermissionBoundary":"arn:aws:iam::123456789012:policy/permissionboundarypolicy/Sample NarrowerPermissionBoundary"
  }
}
{
  "Effect": "Allow",
  "Action": "iam:CreatePolicy",
  "Resource": "*"
}
{
  "Effect": "Allow",
  "Action": [
  "iam:GetUser",
  "iam:GetRole"
  ],
  "Resource": "*"
}

The delegated administrator, Bob, can now create IAM user with the narrower permission boundary policy as follows:
Bob.CreateUser(Name=Elliot,
PermissionBoundary=SampleNarrowerPermissionBoundary)

In a fourth scenario, the delegated administrator, Bob, wants to change permission boundary for Elliot. The delegated administrator, Bob, cannot change permission boundary. Therefore, delegated administrator, Bob, requests the central administrator, Alice, to do this instead. Alice sets the permission boundary SamplePermissionBoundary for Elliot as follows:
Alice.SetUserPermissionBoundary(Name=Elliot,
PermissionBoundary=SamplePermissionBoundary)

In a fifth scenario, the created user, Dan, wants to attach a permission boundary policy on an IAM principal that already exists, the IAM user Finch. Dan does not have these permissions. Therefore, Dan requests the central administrator, Alice, to attach a permission boundary policy on Finch as follows:
Alice.SetUserPermissionBoundary(Name=Finch,
PermissionBoundary=SamplePermissionBoundary)

In a sixth scenario, the delegated administrator, Bob, wants to verify Finch's permission boundary and does so as follows:
Bob.GetUser(Name=Finch)

The response will include the permission boundary policy for Finch.

Figure 3A:
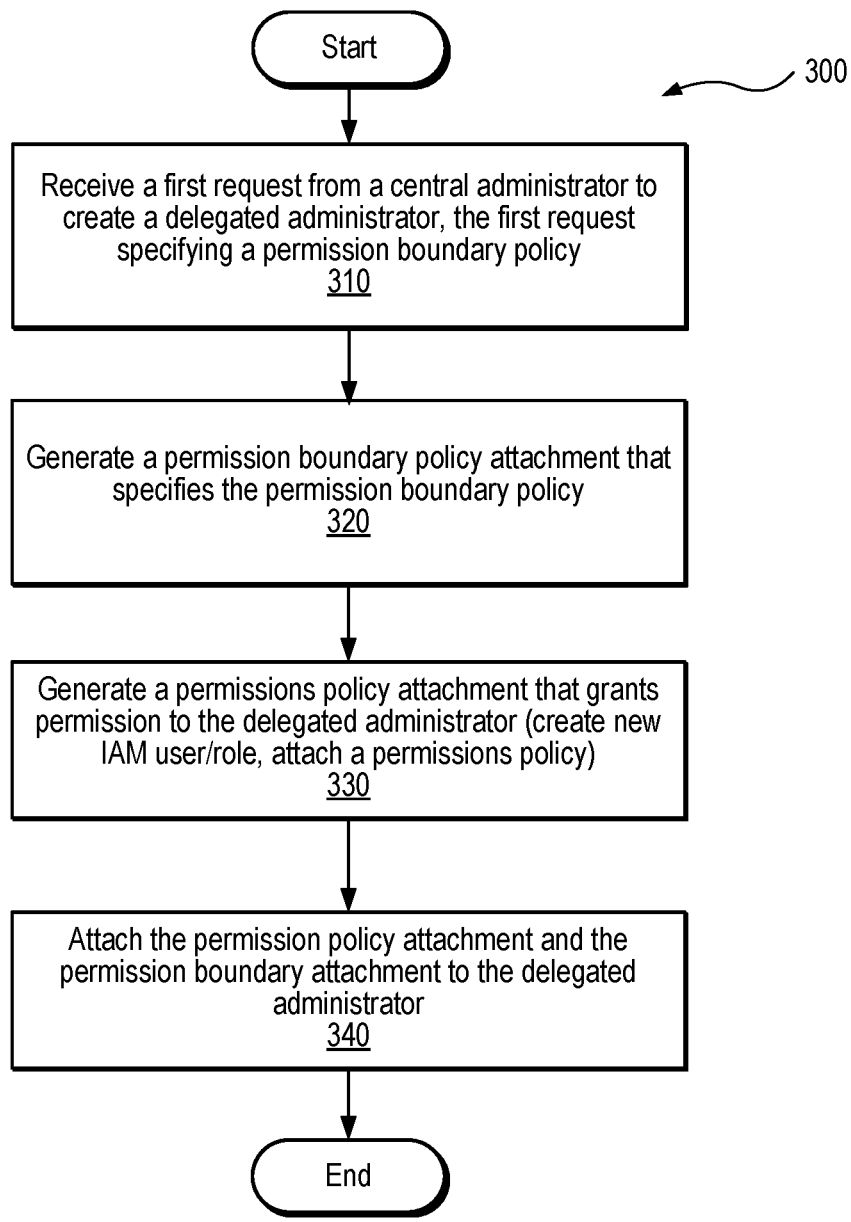
FIG. 3A illustrates a flowchart that provides an example of a process executed by a client permissions manager, according to various embodiments.

FIG. 3A illustrates a flowchart that provides an example of a process 300 executed by a client permissions manager, according to various embodiments. It is understood that the flowchart of FIG. 3A provides an example of the many different types of functional arrangements that may be employed to implement the operation of the client permissions manager as described herein. Process 300 may be performed by a processing logic that may comprise hardware (e.g., circuitry, dedicated logic, programmable logic, microcode, etc.), software (e.g., instructions run on a processing device), or a combination thereof. In one embodiment, the client permissions manager 115 of FIG. 1 executes the process 300 to generate permissions policies 143 and permission boundary policies 147s. In another embodiment, the client permissions manager 200 of FIG. 2 executes the process 300. In another embodiment, other components of the access management system 110 can perform some or all of the process 300. In another embodiment, an IAM service executed by one or more computing devices performs some or all of the process 300.

Referring back to FIG. 3A, the processing logic begins the process 300 by receiving a first request from a central administrator to create a delegated administrator, the first request specifying a permission boundary policy with one or more access permissions to allow and deny access to the web services and resources (block 310). At block 320, the processing logic generates a permission boundary policy attachment that specifies the permission boundary policy. At block 330, the processing logic generates a permissions policy attachment that grants permissions to the delegated administrator. The permissions can include, for example, permission to create a new IAM user with the permission boundary policy attachment and attach a permissions policy to the new IAM user. An effective permission on the new IAM user is an intersection of access permissions specified in the permissions policy attachment and the one or more access permissions in the permission boundary policy attachment. The processing logic attaches the permissions policy attachment and the permission boundary policy attachment to the delegated administrator (block 340) and the process 300 ends.

Figure 3B:
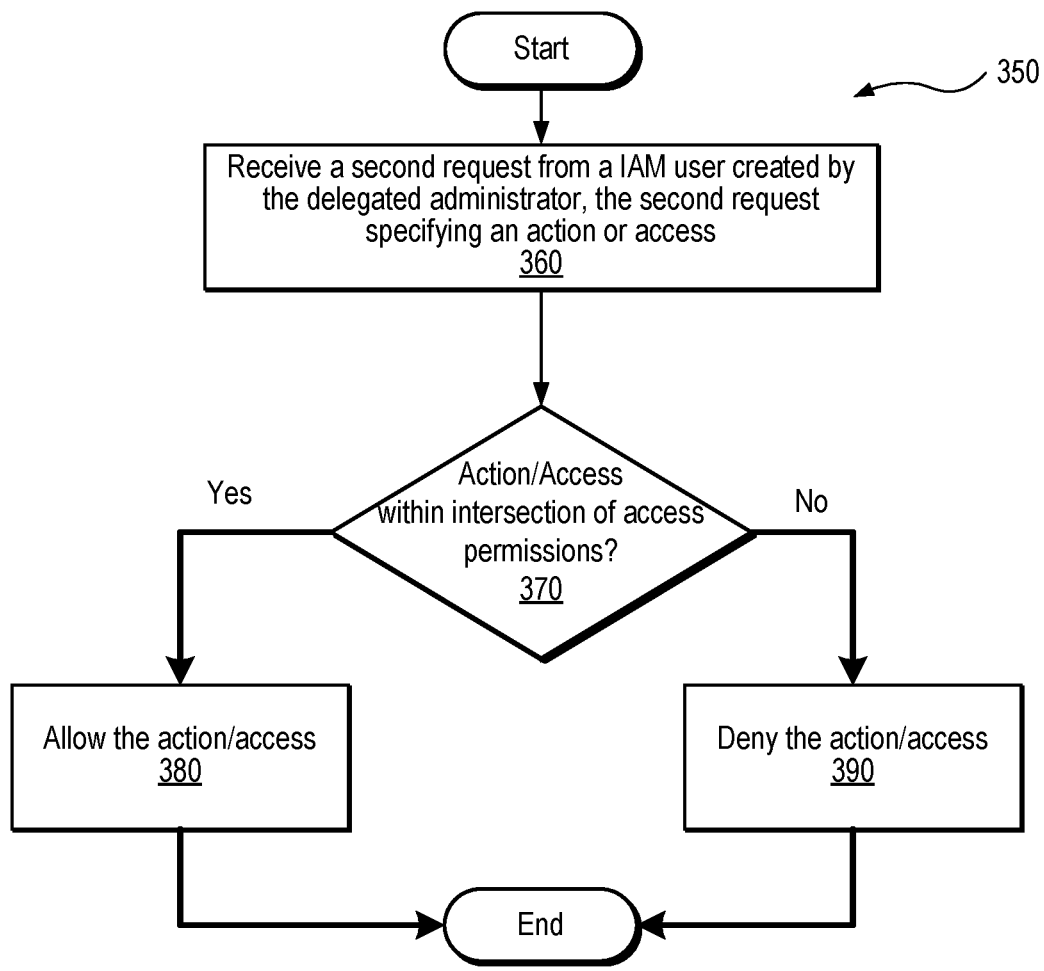
FIG. 3B illustrates a flowchart that provides an example of a process executed by a client permissions manager, according to various embodiments.

FIG. 3B illustrates a flowchart that provides an example of a process 350 executed by a client permissions manager, according to various embodiments. It is understood that the flowchart of FIG. 3A provides an example of the many different types of functional arrangements that may be employed to implement the operation of the client permissions manager as described herein. Process 350 may be performed by a processing logic that may comprise hardware (e.g., circuitry, dedicated logic, programmable logic, microcode, etc.), software (e.g., instructions run on a processing device), or a combination thereof. In one embodiment, the client permissions manager 115 of FIG. 1 executes the process 350 to generate permissions policies 143 and permission boundary policies 147s. In another embodiment, the client permissions manager 200 of FIG. 2 executes the process 350. In another embodiment, other components of the access management system 110 can perform some or all of the process 350. In another embodiment, an IAM service executed by one or more computing devices performs some or all of the process 350.

Referring back to FIG. 3B, the processing logic begins the process 350 by receiving a second request from a IAM user created by the delegated administrator, the second request specifying at least one of an action or access to a web service or a resource (block 360). At block 370, the processing logic determines whether the action or access for the IAM user is within the intersection of access permissions specified in the permissions policy attachment and the one or more access permissions in the permission boundary policy attachment. The processing logic allows the action or access when the action or access is within the intersection of access permissions specified in the permissions policy attachment and the one or more access permissions in the permission boundary policy attachment (block 380) and the process 350 ends. The processing logic denies the action or access when the action or access is not within the intersection of access permissions specified in the permissions policy attachment and the one or more access permissions in the permission boundary policy attachment (block 390) and the process 350 ends. In another embodiment, at block 370, the processing logic can first check whether the action or access is within the access permissions specified in the permissions policy attachment. If the action/access is not within the access permissions specified in the permissions policy attachment, the processing logic proceeds to block 390. If the action/access is within the access permissions of the permissions policy attachment, the processing logic can check whether the action or access is within the access permissions specified in the permission boundary policy attachment. If the action/access is not within the access permissions permission boundary policy attachment, the processing logic proceeds to block 390. If the action/access is within the access permissions of the permission boundary policy attachment, the processing logic proceeds to block 380.

In a further embodiment, the processing logic can receive a third request from the delegated administrator to create the IAM user with the permission boundary policy attachment. In response to the third request, the processing logic creates the IAM user and attaches the permissions boundary policy attachment to the IAM user. In another embodiment, the processing logic receives a third request from the delegated administrator to create the IAM user with the permission boundary policy attachment and attach a second permissions policy attachment. In response to the third request, the processing logic creates the IAM user and attaches the permissions boundary policy attachment and the second permission policy attachment to the IAM user.

In another embodiment, a method is performed by processing logic (e.g., an identity and access management (IAM) service executed by one or more computing devices) and the processing logic begins the method by receiving a first request from a central administrator to create a delegated administrator, the first request specifying with one or more access permissions. The processing logic generates a permission boundary policy that specifies the one or more access permissions and a first permissions policy that grants permissions to the delegated administrator. The permissions granted to the delegated administrator may include one or more of the following: permission to create an IAM principal with the permission boundary policy, permission to attach a second permissions policy to the IAM principal, permission to modify an existing IAM principal, permission to attach or detach a new or existing permissions policy, or the like. In any event, an effective permission given to the IAM principal is an intersection of access permissions specified in the first permissions policy and the one or more access permissions in the permission boundary policy. The processing logic attaches the first permissions policy and the permission boundary policy to the delegated administrator.

In a further embodiment, the processing logic receives a request from the delegated administrator to create a new IAM principal. The processing logic, in response, creates the new IAM principal with the permissions boundary policy. In some instances, the request may specify one or more additional permissions policies. The processing logic can create the new IAM principal and attach the permission boundary policy, as well as the one or more additional permissions policies. The effective permission of the new IAM principal is an intersection of the access permissions of the permission boundary policy and the one or more additional permissions policies. For example, the processing logic receives a second request from the delegated administrator to create a new IAM principal and attach the second permissions policy to the new IAM principal. The access permissions specified in the second permissions policy may be greater than the one or more access permissions specified in the permission boundary policy. In response to the second request, the processing logic creates the new IAM principal and attaches the second permissions policy to the new IAM principal. The effective permission given to the new IAM principal is an intersection of the access permissions specified in the second permissions policy and the one or more access permissions specified in the permission boundary policy. That is the effective access is limited to the access permissions specified in the permissions boundary policy since the access permission specified in the second permission policy is greater than the one or more access permission specified in the permission boundary policy. As noted, here, the IAM principal may be an IAM user, an IAM role, or a group of IAM users. In a further embodiment, the first permissions policy grants permissions to the delegated administrator to create a new IAM user or a new IAM role for the IAM principal and at least one of attach a user policy to the new IAM user, detach a user policy from an existing IAM user, attach a role policy to the new IAM role, or detach a role policy from an existing IAM role. In another embodiment, the first permissions policy further grants permissions to the delegated administrator to create a new policy, verify the permission boundary policy for an existing IAM user, or verify the permission boundary policy for an existing IAM role. In another embodiment, the IAM service can set a flag for the IAM principal, the flag indicating that the permission boundary policy is associated with the IAM principal. An administrator (central administrator or delegated administrator) can verify that the permission boundary policy is attached by checking whether the flag is set.

In another embodiment, the processing logic receives a second request from the delegated administrator to attach an administrator access policy to an existing IAM user. In response to the second request, the processing logic attaches the administrator access policy to the existing IAM user. An effective permission given to the existing IAM user is limited to the one or more access permissions specified in the permission boundary policy. In other words, an effective permission given to the existing IAM principal is an intersection of the access permissions specified in the administrator access policy and the one or more access permissions specified in the permission boundary policy. Alternatively, the processing logic could verify that the existing IAM user was created by the delegated administrator or the central administrator.

As described herein, the delegated administrator may desire to generate a narrower managed policy that restricts the IAM principal's access permission even further than the access permissions granted by the permission boundary policy. In one embodiment, the processing logic receives a second request to create a second delegated administrator, the second request specifying a second set of one or more access permissions that are less than (e.g., are limited or are more narrower in scope than) the one or more access permissions in the permission boundary policy. In response to the second request, the processing logic generate a second permission boundary policy and sends a third request to the central administrator to update the permissions to the delegated administrator to use the second permission boundary policy. The third request may be a request to update manually, a request that, once approved by the central administrator, automatically updates the permissions or completes the initial request to create the second delegated administrator with the narrower permissions, or a simple notification to the central administrator of the action to be taken by the central administrator. Alternatively, the processing logic can send a request to update the first permission policy to include a permission to the delegated administrator to use a narrower permission boundary than the original permission boundary. In a further embodiment, the processing logic receives a fourth request from the central administrator to update the permission to the delegated administrator in the first permission policy to use the second permission boundary policy. In response to the fourth request, the processing logic updates the permission to the delegated administrator in the first permission policy to use the second permission boundary policy. In a further embodiment, the processing logic receives a fifth request from the second delegated administrator to create a second new IAM principal with the second permission boundary policy and attach a third permissions policy to the second new IAM principal. In response to the fifth request, the processing logic creates the second new IAM principal and optionally attaches the third permissions policy to the second new IAM principal. An effective permission given to the second new IAM principal is an intersection of the access permissions specified in the third permissions policy and the access permissions specified in the second permission boundary policy. In other words, the effective permission is limited to the second permission boundary policy since it is narrower.

In a further embodiment, the processing logic receives a fifth request from the delegated administrator to modify the second permission boundary policy for the second delegated administrator. In response to the fourth request, the processing logic sends a sixth request to the central administrator to modify the second permission boundary policy for the second delegated administrator. Subsequently, the processing logic receives a seventh request from the central administrator to modify the second permission boundary policy for the second delegated administrator. In response to the seventh request, the processing logic updates the second permission boundary policy for the second delegated administrator. As described herein, the sixth request may be a request to modify the second permission boundary policy manually, a request that, once approved by the central administrator, automatically modifies the second permission boundary policy or completes the initial request, or a simple notification to the central administrator of the action to be taken by the central administrator.

In another embodiment, the processing logic receives a second request from the delegated administrator to modify an existing permission boundary policy for an existing delegated administrator. In response to the second request, the processing logic sends a third request to the central administrator to modify the existing permission boundary policy for the existing delegated administrator. The processing logic also receives a fourth request from the central administrator to modify the existing permission boundary policy for the existing delegated administrator. IN response, the processing logic updates the existing permission boundary policy for the existing delegated administrator.

In another embodiment, the processing logic receives a second request from the delegated administrator to attach the permission boundary policy to an existing IAM principal (IAM user or IAM role). In response to the second request, the processing logic sends a third request to the central administrator to attach the permission boundary policy to the existing IAM principal. The processing logic receives a fourth request from the central administrator to attach the permission boundary policy to the existing IAM principal. In response to the fourth request, the processing logic attaches the permission boundary policy to the existing IAM principal.

In another embodiment, the processing logic receives a second request from the delegated administrator to verify a permission boundary policy for an existing IAM principal (IAM user or IAM role). The processing logic determines that a verify action for the existing IAM principal is within the intersection of access permissions specified in the first permissions policy and the one or more access permissions in the permission boundary policy. The processing logic sends a response to the delegated administrator with the permission boundary policy for the existing IAM principal when the verify action is permitted.

FIGS. 4A-4D illustrate a flow diagram a flow of operations 400 of with an IAM service 410 having a client permissions manager according to one embodiment. In the depicted embodiments of FIG. 4A-4C, the IAM service 410 includes a client permissions manager that interacts with one or more client devices 430, 440, and 450. In the depicted embodiments of FIG. 4D, the IAM service 410 includes the client permissions manager that interacts with one or more web services or resources, such as AWS E2C 460 and AWS S3 470. The flow of operations 400 may include additional interactions with additional clients and additional services or resources.

Referring to FIG. 4A, a client device 430 sends a request 401 to the IAM service 410 to create a permission boundary policy for a delegated administrator. The IAM service 410 generates a permission boundary attachment 403, generates a first permissions policy 405, and attaches the first permissions policy attachment and the permission boundary attachment to the delegated administrator 407. The IAM service 410 sends a response 409 to the client device 430 to indicate that the delegated administrator is created with the permission boundary attachment. In one embodiment, the IAM service 410 can also notify other instances of the IAM service and waits for the updated delegated administrator to be available at global end-points. After waiting for the updated administrator, the IAM service 410 can send the response 409 to the client device 430.

Subsequently, a delegated administrator, via a second client device 440, sends a request 411 to the IAM service 410 to create a new IAM principal. The IAM service 410 creates the new IAM principal with the permission boundary policy 413. The IAM service 410 sends a response 415 to the client device 430 to indicate that the new IAM principal is created with the permission boundary attachment.

In another instance, the delegated administrator, via the second client device 440, sends a request 417 to the IAM service 410 to create a new IAM principal and attach a second permissions policy to the new IAM principal. The IAM service 410 creates the new IAM principal with the permission boundary policy 419 and attaches the second permissions policy 421. The IAM service 410 sends a response 423 to the client device 430 to indicate that the new IAM principal is created with the permission boundary attachment and the second permissions policy attached.

Referring to FIG. 4B, the client device 430 sends a request 425 to the IAM service 410 to attach an administrator access policy to an existing IAM user (or IAM user role) by the delegated authority. The IAM service 410 attaches the administrator access policy to the existing IAM user 427, the existing IAM user being subject to the permission boundary attachment. The IAM service 410 sends a response 429 to the client device 430 to indicate that the administrator access policy is attached to the existing IAM user.

In another instance, the delegated administrator, via the second client device 440, sends a request 431 to create a narrower-scoped permission boundary policy for a second delegated administrator. The IAM service 410 generates a narrower permission boundary attachment 433 and generates a second permission policy 435. Because the delegated administrator does not have permission to change the permission boundary policy, the IAM service 410 sends a request 437 to the first client device 430 for the central administrator to authorize to update the first permissions policy. The client device 430 sends an authorization 439 to update the first permissions policy to include permission for the delegated administrator to use the narrower permission boundary attachment for a second delegated administrator. The IAM service 410 updates the first permissions policy 411 and attaches a second permission policy to the second delegated administrator 443. The IAM service 410 can send a response 445 to the second client device 440 to indicate the narrower permission boundary policy is available for use when creating new IAM principals. The IAM service 410 can also send a response 447 to the first client 430 to indicate the narrower permission boundary policy is available for use by the delegated administrator when creating new IAM principals.

Referring to FIG. 4C, a second delegated administrator, via a third client device 450, sends a request 449 to the IAM service 410 to create a second new IAM principal with the narrower permission boundary policy. The IAM service 410 attaches a third permissions policy to the second new IAM principal, along with the narrower permission boundary policy. An effective permission of the second new IAM principal is an intersection of access permissions in the third permissions policy and the narrower permission boundary policy. The IAM service 410 sends a response 453 to the third client device 450 to indicate that the second new IAM principal is created with the narrower permission boundary attachment and the third permissions policy attached.

In another instance, a first delegated administrator, via the second client device 440, sends a request 455 to modify the second permission boundary policy (e.g., a narrower permission boundary policy) to the first permission boundary policy for the second delegated administrator. Because the first delegated administrator does not have permission to modify the permission boundaries, the IAM service 410 sends a request to the central administrator at the first client device 430 to authorize the update. The client device 430 sends an authorization 450 to update the second permission boundary policy to the first permission boundary policy for the second delegated administrator. The IAM service 410 attaches the first permissions policy to the second delegated administrator 461. The IAM service 410 can also detach the second permissions policy.

The IAM service 410 can send a response 463 to the second client device 440 to indicate the second delegated administrator is updated from the second permission boundary policy to the first permission boundary policy. The IAM service 410 can also send a response 465 to the first client 430 to indicate the second delegated administrator is updated from the second permission boundary policy to the first permission boundary policy.

As described herein, the IAM service 410 can use the permission boundary policy for enforcement, such as illustrated in a couple of examples in FIG. 4D.

Referring to FIG. 4D, a client device 490 sends a request 467 to an AWS EC2 service 460 to perform an action or to access the AWS EC2 service 460. The AWS EC2 service 460 sends an authorization request 469 to the IAM service 410. The IAM service 410 determines 471 if the action/access is within an intersection of the access permissions for the particular IAM principal. This IAM principal was created by the delegated administrator, so the effective permissions of the IAM principal is the intersection of the first permissions policy and the permission boundary policy. The IAM service 410 sends a response 473 back to the AWS E2C service 460 to indicate that the action/access is allowed or denied. Assuming the action/access is allowed by the IAM service 410, the AWS E2C service 460 performs the action 475 (or grants access) and sends a response 477 to the client device 490.

In another instance, the client device 490 sends a request 479 to an AWS S3 service 470 to perform an action or to access the AWS S3 service 470. The AWS S3 service 470 sends an authorization request 481 to the IAM service 410. The IAM service 410 determines 483 if the action/access is within an intersection of the access permissions for the particular IAM principal. The IAM service 410 sends a response 485 back to the AWS S3 service 470 to indicate that the action/access is allowed or denied. Assuming the action/access is allowed by the IAM service 410, the AWS S3 service 470 performs the action 487 (or grants access) and sends a response 489 to the client device 490. Alternatively, other services can request access authorization from the IAM service 410.

Figure 5:
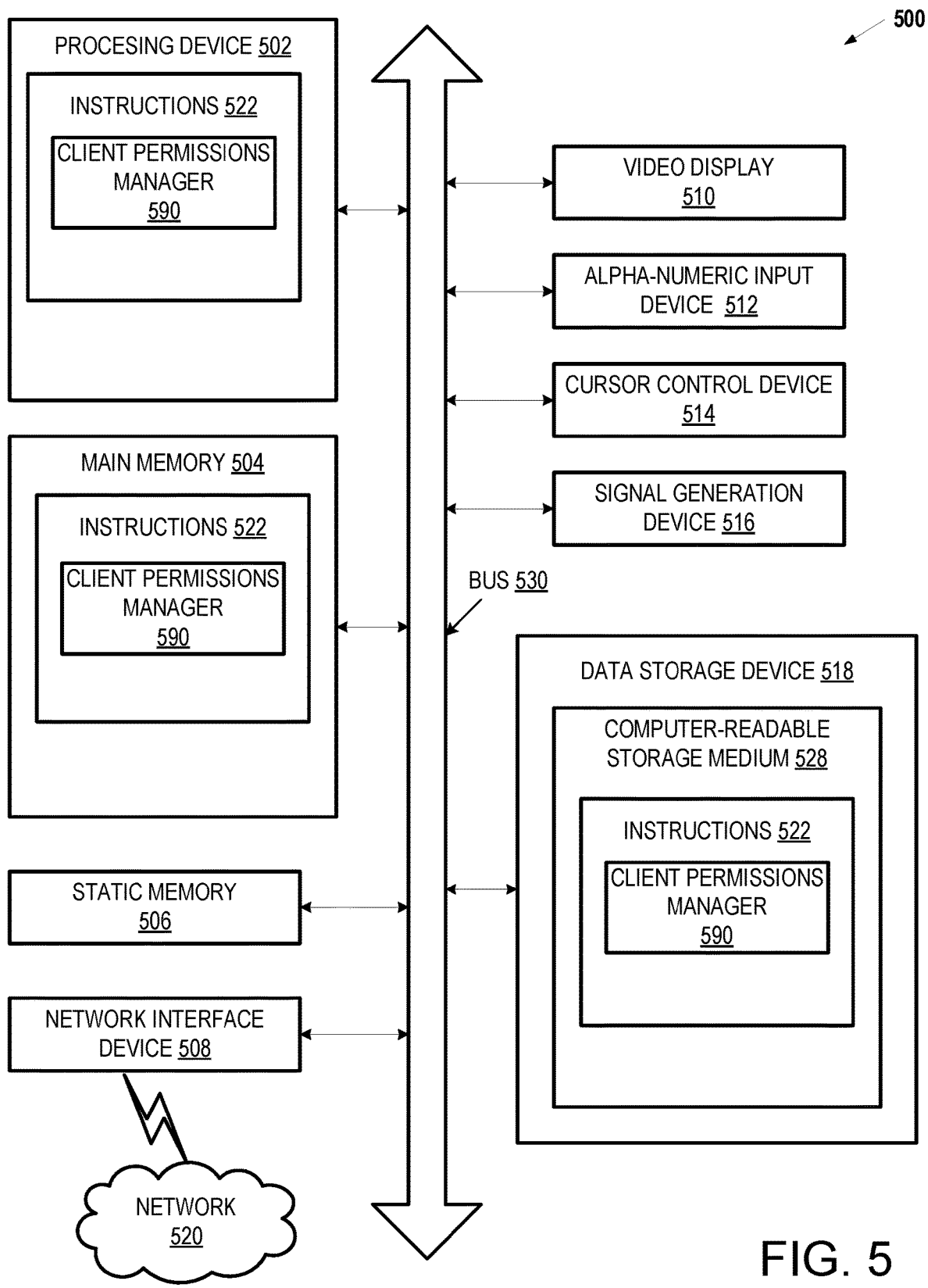
FIG. 5 illustrates a diagrammatic representation of a machine in the example form of a computer system including a set of instructions executable by a client permissions manager to cause the system to perform any one or more of the methodologies discussed herein.

FIG. 5 illustrates a diagrammatic representation of a machine in the example form of a computer system 500 including a set of instructions 522 executable by a client permissions manager 590 to cause the system to perform any one or more of the methodologies discussed herein. In one embodiment, the client permissions manager 590 may include instructions 522 to enable execution of the processes and corresponding components shown and described in connection with FIGS. 1-4D.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions 522 (sequential or otherwise) that specify actions to be taken by that machine. Further, while a single machine is illustrated, the term "machine" shall also be taken to include any collection of machines that individually or jointly execute a set (or multiple sets) of instructions 522 to perform any one or more of the methodologies discussed herein The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions 522 for the client permissions manager 590 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 of the client permissions manager 590 embodying any one or more of the methodologies or functions described herein. One or more machine-readable mediums having stored thereon one or more instructions, which if performed by one or more processors, cause the one or more processors to at least any of the operations described herein.

The instructions may also reside, completely or at least partially, within the main memory 504 and/or within processing logic of the processing device 502 during execution thereof by the computer system 500, the main memory 504 and the processing device 502 also constituting computer-readable media.

The instructions 522 may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions 522. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by an identity and access management (IAM) service executed by one or more computing devices and manages access to web services and resources, a first request from a central administrator to create a delegated administrator, the first request specifying a permission boundary policy with one or more access permissions to allow and deny access to the web services and resources;
    in response to the first request:
        generating a permission boundary policy attachment that specifies the permission boundary policy;
        generating a permissions policy attachment that grants permissions to the delegated administrator to create a new IAM user with the permission boundary policy attachment and that grants permissions to the delegated administrator to attach a permissions policy to the new IAM user, wherein an effective permission on the new IAM user is an intersection of access permissions specified in the permissions policy attachment and the one or more access permissions in the permission boundary policy attachment; and
        attaching the permissions policy attachment and the permission boundary policy attachment to the delegated administrator;
    receiving, by the IAM service, a second request from a IAM user created by the delegated administrator, the second request specifying at least one of an action or access to a web service or a resource;
    determining, by the IAM service, that the action or access for the IAM user is within the intersection of access permissions specified in the permissions policy attachment and the one or more access permissions in the permission boundary policy attachment; and
    allowing or denying the action or access in view of the determining.

2. The method of claim 1, further comprising:
    receiving, by the IAM service, a third request from the delegated administrator to create the IAM user with the permission boundary policy attachment; and
    in response to the third request, creating the IAM user and attach the permissions boundary policy attachment to the IAM user.

3. A method comprising:
    receiving, by an identity and access management (IAM) service executed by one or more computing devices and manages access to at least one of web services or resources, a first request from a central administrator to create a delegated administrator, the first request specifying with one or more access permissions;
    generating a permission boundary policy that specifies the one or more access permissions;
    generating a first permissions policy that grants permissions to the delegated administrator to at least one of create an IAM principal with the permission boundary policy or associate a second permissions policy to the IAM principal, wherein an effective permission given to the IAM principal is an intersection of access permissions specified in the first permissions policy and the one or more access permissions in the permission boundary policy;
associating the first permissions policy and the permission boundary policy to the delegated administrator;
receiving, by the IAM service, a second request from the delegated administrator to create a new IAM principal and associate the second permissions policy to the new IAM principal, wherein access permissions specified in the second permissions policy are different than the one or more access permissions specified in the permission boundary policy; and
in response to the second request, creating the new IAM principal and associate the second permissions policy to the new IAM principal, wherein an effective permission given to the new IAM principal is an intersection of the access permissions specified in the second permissions policy and the one or more access permissions specified in the permission boundary policy.

4. The method of claim 3, further comprising:
receiving, by the IAM service, a third request from the delegated administrator to create a new IAM principal with the permission boundary policy; and
in response to the third request, creating the new IAM principal with the permission boundary policy.

5. The method of claim 3,
wherein the access permissions specified in the second permissions policy are greater than the one or more access permissions specified in the permission boundary policy.

6. The method of claim 3, wherein the IAM principal is at least one of an IAM user, an IAM role, or a group of IAM users.

7. The method of claim 3, wherein the first permissions policy grants permissions to the delegated administrator to create a new IAM user or a new IAM role for the IAM principal and at least one of associate a user policy to the new IAM user, detach a user policy from an existing IAM user, associate a role policy to the new IAM role, or detach a role policy from an existing IAM role.

8. The method of claim 3, further comprising setting a flag for the IAM principal, the flag indicating that the permission boundary policy is associated with the IAM principal.

9. The method of claim 3, further comprising:
receiving, by the IAM service, a third request from the delegated administrator to associate an administrator access policy to an existing IAM user; and
in response to the third request, associate the administrator access policy to the existing IAM user, wherein an effective permission given to the existing IAM user is limited to the one or more access permissions specified in the permission boundary policy.

10. The method of claim 3, further comprising:
receiving, by the IAM service, a third request to create a second delegated administrator, the third request specifying a second set of one or more access permissions that are less than the one or more access permissions in the permission boundary policy; and
in response to the third request:
generating a second permission boundary policy; and
sending a fourth request to the central administrator to update the permissions to the delegated administrator to use the second permission boundary policy.

11. The method of claim 10, further comprising:
receiving, by the IAM service, a fifth request from the central administrator to update the permissions to the delegated administrator in the first permission policy to use the second permission boundary policy; and
in response to the fifth request, update the permissions to the delegated administrator in the first permission policy to use the second permission boundary policy.

12. The method of claim 11, further comprising:
receiving, by the IAM service, a sixth request from the second delegated administrator to create a second new IAM principal with the second permission boundary policy and associate a third permissions policy to the second new IAM principal; and
in response to the sixth request, create the second new IAM principal and associate the third permissions policy to the second new IAM principal, wherein an effective permission given to the second new IAM principal is an intersection of the access permissions specified in the third permissions policy and the access permissions specified in the second permission boundary policy.

13. The method of claim 11, further comprising:
receiving, by the IAM service, a sixth request from the delegated administrator to modify the second permission boundary policy for the second delegated administrator;
in response to the sixth request, send a seventh request to the central administrator to modify the second permission boundary policy for the second delegated administrator;
receiving, by the IAM service, a eighth request from the central administrator to modify the second permission boundary policy for the second delegated administrator; and
in response to the eighth request, updating, by the IAM service, the second permission boundary policy for the second delegated administrator.

14. The method of claim 3, further comprising:
receiving, by the IAM service, a third request from the delegated administrator to modify an existing permission boundary policy for an existing delegated administrator;
in response to the third request, send a fourth request to the central administrator to modify the existing permission boundary policy for the existing delegated administrator; and
receiving, by the IAM service, a fifth request from the central administrator to modify the existing permission boundary policy for the existing delegated administrator; and
in response to the fifth request, updating, by the IAM service, the existing permission boundary policy for the existing delegated administrator.

15. The method of claim 3, further comprising:
receiving, by the IAM service, a third request from the delegated administrator to associate the permission boundary policy to an existing IAM principal;
in response to the third request, send a fourth request to the central administrator to associate the permission boundary policy to the existing IAM principal;
receiving, by the IAM service, a fifth request from the central administrator to associate the permission boundary policy to the existing IAM principal; and
in response to the fifth request, associating, by the IAM service, the permission boundary policy to the existing IAM principal.

16. The method of claim 3, further comprising:
receiving, by the IAM service, a third request from the delegated administrator to verify a permission boundary policy for an existing IAM principal;
determining, by the IAM service, that a verify action for the existing IAM principal is within the intersection of access permissions specified in the first permissions policy and the one or more access permissions in the permission boundary policy; and
sending, by the IAM service, a response to the delegated administrator with the permission boundary policy for the existing IAM principal when the verify action is permitted.

17. One or more non-transitory machine-readable mediums having stored thereon one or more instructions, which when executed by one or more processors of an identity and access management (IAM) service that manages access to at least one of web services or resources, cause the one or more processors to at least:
receive a first request from a central administrator to create a delegated administrator, the first request specifying with one or more access permissions;
generate a permission boundary policy that specifies the one or more access permissions;
generate a first permissions policy that grants permissions to the delegated administrator to at least one of create an identity and access management (IAM) principal with the permission boundary policy or attach a second permissions policy to the IAM principal, wherein an effective permission given to the IAM principal is an intersection of access permissions specified in the first permissions policy and the one or more access permissions in the permission boundary policy;
attach the first permissions policy and the permission boundary policy to the delegated administrator;
receive a second request from the delegated administrator to create a new IAM principal and attach the second permissions policy to the new IAM principal, wherein access permissions specified in the second permissions policy are different than the one or more access permissions specified in the permission boundary policy; and
in response to the second request, create the new IAM principal and attach the second permissions policy to the new IAM principal, wherein an effective permission given to the new IAM principal is an intersection of the access permissions specified in the second permissions policy and the one or more access permissions specified in the permission boundary policy.

18. The one or more non-transitory machine-readable mediums of claim 17, wherein the one or more instructions further cause the one or more processors to:
receive a third request from the delegated administrator to create a new IAM principal with the permission boundary policy; and
in response to the third request, create the new IAM principal with the permission boundary policy.

19. The one or more non-transitory machine-readable mediums of claim 17,
wherein the access permissions specified in the second permissions policy are greater than the one or more access permissions specified in the permission boundary policy.

20. The one or more non-transitory machine-readable mediums of claim 17, wherein the IAM principal is at least one of an IAM user, an IAM role, or a group of IAM users.

* * * * *

UNITED STATES PATENT AND TRADEMARK OFFICE
CERTIFICATE OF CORRECTION

Page 1 of 1

PATENT NO. : 11,032,287 B1
APPLICATION NO. : 16/122192
DATED : June 8, 2021
INVENTOR(S) : Mingkun Wang and Jasmeet Chhabra It is certified that error appears in the above-identified patent and that said Letters Patent is hereby corrected as shown below:

In the Claims

In Claim 13, Column 24, Line 30, delete "a" and insert --an--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*